UNITED STATES PATENT OFFICE.

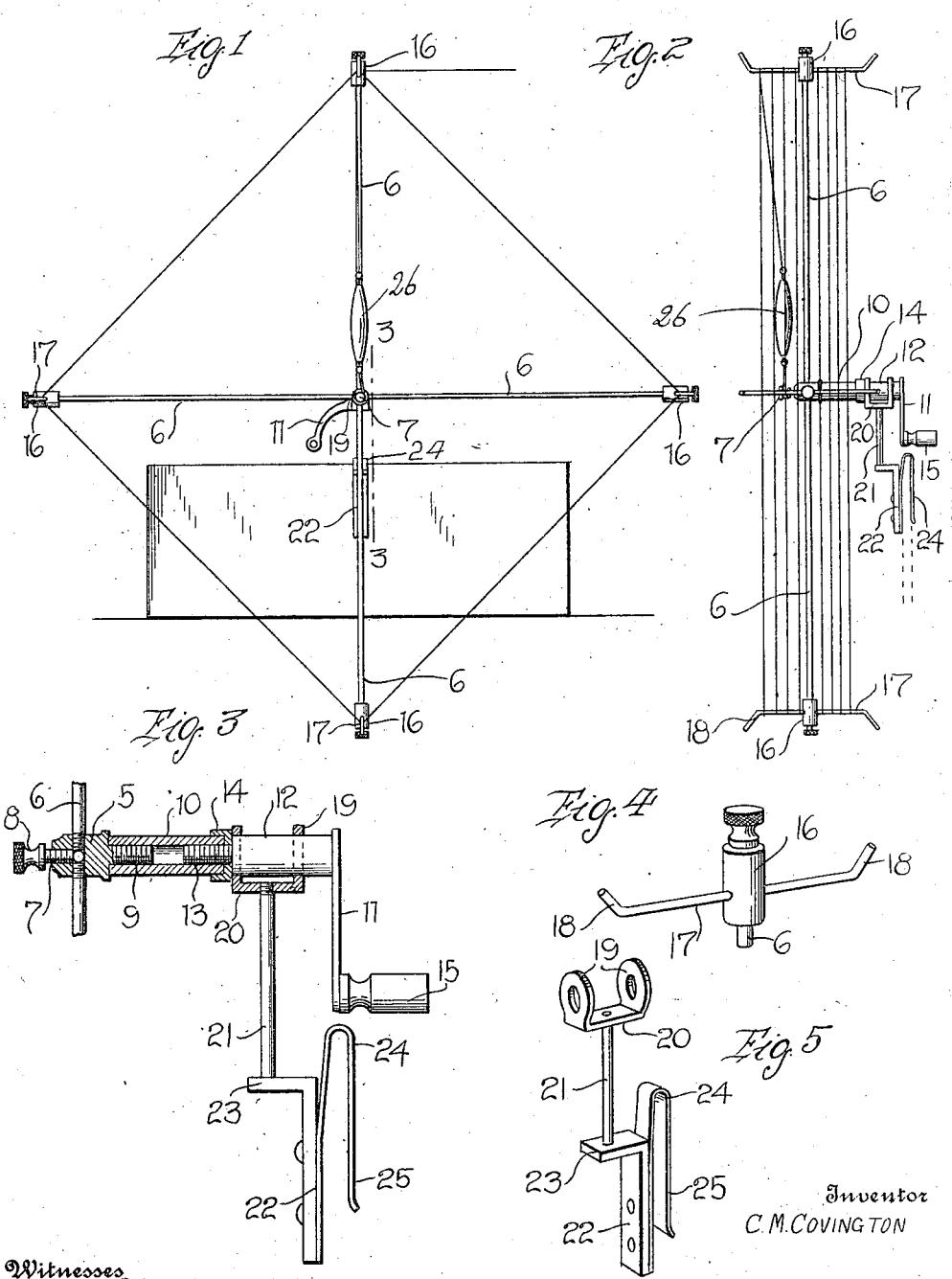

CAPRES M. COVINGTON, OF HARRISON, ARKANSAS.

FISHING-LINE-DRYING REEL.

1,081,435.   Specification of Letters Patent.   Patented Dec. 16, 1913.

Application filed May 10, 1913. Serial No. 766,867.

*To all whom it may concern:*

Be it known that I, CAPRES M. COVINGTON, citizen of the United States, residing at Harrison, in the county of Boone and State of Arkansas, have invented certain new and useful Improvements in Fishing-Line-Drying Reels, of which the following is a specification, reference being had to the accompanying drawings.

This invention relates to improvements in fishing line drying reels and has for its primary object to provide a very simple, efficient and durably constructed device of this character comprising a plurality of elements which may be easily and quickly assembled for use and disassembled whereby the same can be compactly arranged for convenience in transportation.

The invention has for another object to produce a device of the above character which is highly efficient and serviceable in practical use and owing to the simple form and construction of its several parts, may be produced at small manufacturing cost.

The invention has for another object the provision of an improved supporting means for the reel when the same is in use which may be easily and quickly attached to the edge of a box or other support.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a front elevation of my improved fishing line drying reel showing the same mounted in position for use. Fig. 2 is an elevation looking at right angles to Fig. 1; Fig. 3 is a section taken on the line 3—3 of Fig. 1; Fig. 4 is a detail perspective view of one of the line supporting arms; and Fig. 5 is a similar view of the reel supporting member.

Referring in detail to the drawings, 5 designates a hub member which is of hollow cylindrical form and is provided in its body wall at diametrically opposite points with threaded openings to receive the radially extending rods 6, the inner ends of which are threaded for engagement in said openings. The hub 5 at one of its ends is reduced and interiorly threaded to receive a pin 7 which is adapted for binding engagement against the inner ends of the radiating rods 6. This pin is provided with a head having an annular groove 8 provided therein for a purpose which will be later explained. The other end of the hub has integrally formed therewith a reduced longitudinal threaded extension 9 to receive the interiorly threaded tubular member 10. A crank 11 is provided with a cylindrical arm 12 having a reduced threaded portion 13 for engagement in the other end of the member 10. A stop collar 14 is loosely engaged over the end of said member and is held in position by the binding engagement of the crank arm 12 thereagainst. 15 designates a suitable handle attached to the other arm of the crank.

The outer end of each of the rods 6 is threaded to receive a cylindrical head 16. In this head an arm 17 is fixed, said arm extending upon opposite sides of the head and at right angles to the longitudinal axis thereof. The ends of this arm are slightly bent or curved as indicated at 18.

Upon the cylindrical arm 12 of the crank 11, the spaced rings 19 are loosely engaged, said rings being integrally connected by the plate 20. This plate is centrally provided with a threaded opening whereby the upper threaded end of a rod 21 may be detachably connected thereto. The lower end of this rod is secured in the upper laterally extending end 23 of a bar 22. To this bar, one end of a heavy spring plate 24 is riveted or otherwise secured, said plate being bent upon itself and having its free end 25 disposed in spaced relation to the bar 22.

In the use of the invention, the rods 6 are first threaded into the hub 5 and the member 10 engaged with the threaded extension of said hub. The crank 11 is then connected to the end of the member 10, it being understood that the supporting device has been arranged upon the arm 12 of the crank. The free end of the spring plate 24 is then engaged over the edge of a box or other support. After attaching the arm carrying heads 16 to the outer ends of the rods 6, the device is in condition for use. One of the hooks of the minnow 26 attached to the end of the fishing line is engaged in the groove 8 provided in the head of the pin 7 which is attached to the hub 5. The fishing line is then passed over one of the arms 17 and the reel rotated by turning the crank 11.

The fishing rod is held by one hand while the reel is operated by the other, and the line is slowly unwound from the reel upon the rod, onto the several arms 17. These arms are sufficiently long to enable the strands of the line to be spaced from each other. The curved outer ends of the arms prevent the line from slipping off of the same. After all of the line has been wound upon the reel arms, the same is left thereon until it becomes thoroughly dry. It can then be readily unwound by rewinding the same upon the reel which is carried by the fishing rod. After the device has been used, the several parts thereof may be easily and quickly disconnected from each other and compactly arranged in a case or other receptacle whereby the reel may be conveniently carried from place to place.

From the foregoing, it is believed that the construction and manner of use of my improved fishing line drying reel will be clearly and fully understood. It will also be appreciated that owing to the extremely simple form of the several elements employed in the construction of my invention, the same can be produced at small manufacturing cost. The device is also light in weight, while at the same time it is extremely durable as well as serviceable and efficient in actual use.

While I have shown and described the preferred form and construction of the several parts employed, it will be understood that the invention is susceptible of considerable modification therein without departing from the essential features or sacrificing any of the advantages thereof.

Having thus described the invention, what is claimed is:

1. In a device of the character described, the combination of a hollow interiorly threaded hub, a plurality of radially disposed rods threaded in the body wall of said hub, a pin threaded in one end of said hub and engaging said rods, said pin having a head formed on one end provided with an annular groove, a tubular interiorly threaded member detachably connected to the opposite end of said hub, a crank removably threaded in said member, and a line supporting arm detachably connected upon the outer end of each of said rods and extending at right angles to the longitudinal axis thereof.

2. In a device of the character described, the combination of a hub provided with interior threads in one end, and a reduced threaded extension on its other end, a plurality of radiating arms removably threaded in the body wall of said hub, a pin engaged in the threaded end of said hub and binding against said rods, a member threaded upon the extension of the hub, a crank detachably connected to said member, heads removably threaded upon the outer ends of said radially disposed rods, and a line supporting arm carried by each of the heads extending at right angles to the longitudinal axis of the rod.

In testimony whereof I hereunto affix my signature in the presence of two witnesses.

CAPRES M. COVINGTON.

Witnesses:
N. A. MARKLEY,
W. T. MARKLEY.